May 27, 1952 A. H. DICKINSON 2,598,516

LINEAR VARIATION OF OSCILLATOR FREQUENCY

Filed Aug. 10, 1949 3 Sheets-Sheet 1

INVENTOR
Arthur H. Dickinson
BY
Charles E. McTiernan
AGENT

May 27, 1952 A. H. DICKINSON 2,598,516
LINEAR VARIATION OF OSCILLATOR FREQUENCY
Filed Aug. 10, 1949 3 Sheets-Sheet 2

INVENTOR
Arthur H. Dickinson
BY Charles E. McTiernan
AGENT

LINEAR VARIATION OF OSCILLATOR FREQUENCY

Filed Aug. 10. 1949 3 Sheets-Sheet 3

INVENTOR
Arthur H. Dickinson
BY
Charles E. McTiernan
AGENT

Patented May 27, 1952

2,598,516

UNITED STATES PATENT OFFICE 2,598,516

LINEAR VARIATION OF OSCILLATOR FREQUENCY

Arthur H. Dickinson, Greenwich, Conn., assignor to International Business Machines Corporation, New York, N. Y., a corporation of New York Application August 10, 1949, Serial No. 109,434

4 Claims. (Cl. 250—36)

Figure 1:
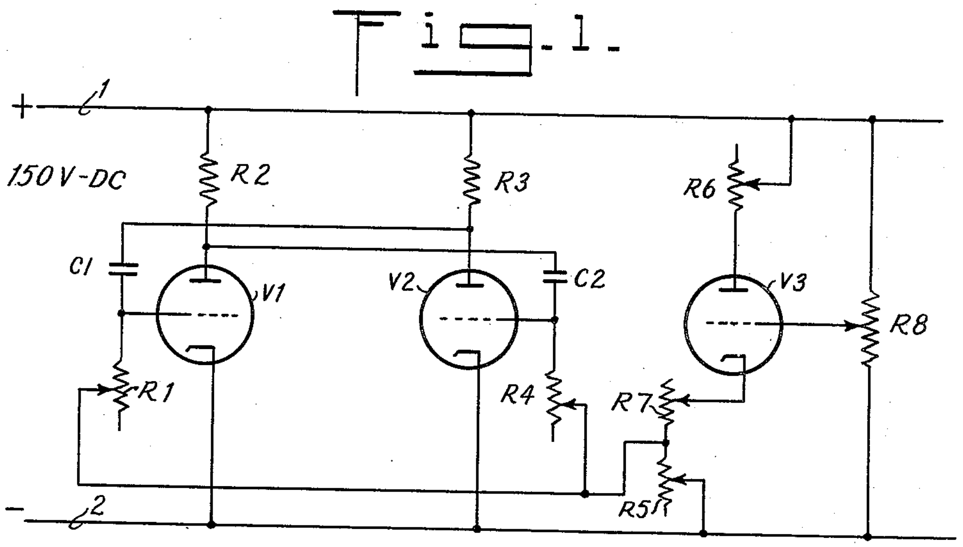

This invention pertains to methods of linearly controlling the frequency of oscillators over a wide range of frequencies.

The principal object of the invention is to provide methods for linearly varying the frequency of oscillation of a relaxation oscillator, in the form of a multivibrator, in response to a varying force.

Another object of the invention is to provide a multivibrator circuit wherein the rate of change of the frequency of oscillation with respect to a varying phenomena is a constant.

Another object of the invention is to provide a circuit arrangement wherein a varying magnitude is converted onto a linear timed basis.

Another object of the invention is to provide an oscillator wherein the frequency of oscillations thereof vary linearly with respect to a varying force.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 shows an illustrative circuit of the main embodiment of the invention wherein the variation of frequency of the multivibrator with respect to a change in the control voltage is a constant.

Figure 1A:
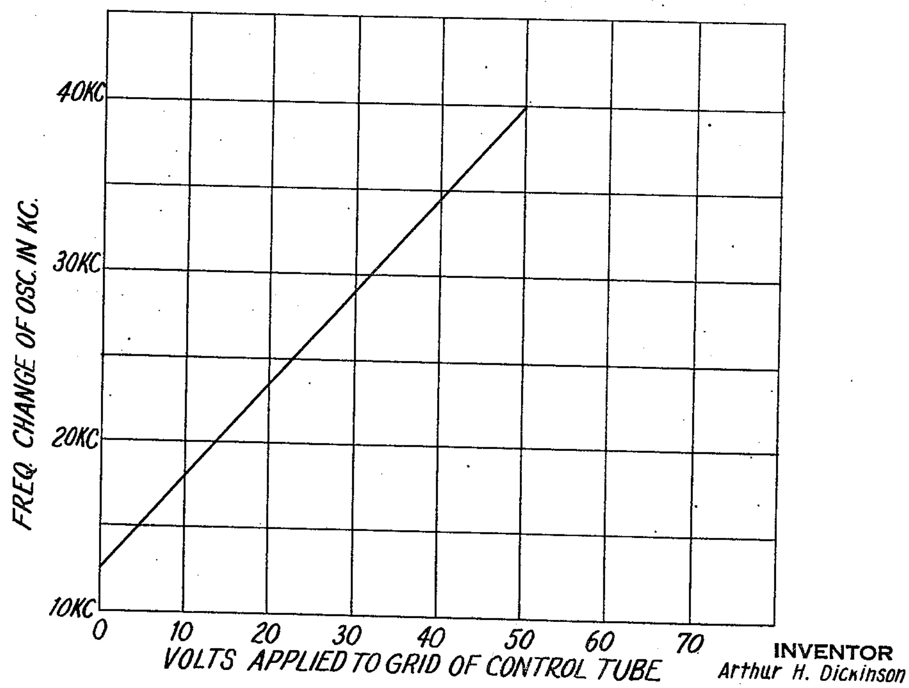

Fig. 1*a* is a graphical representation showing the linear relationship between the control voltage produced by the varying quantity and the frequency of the multivibrator.

Figure 2:
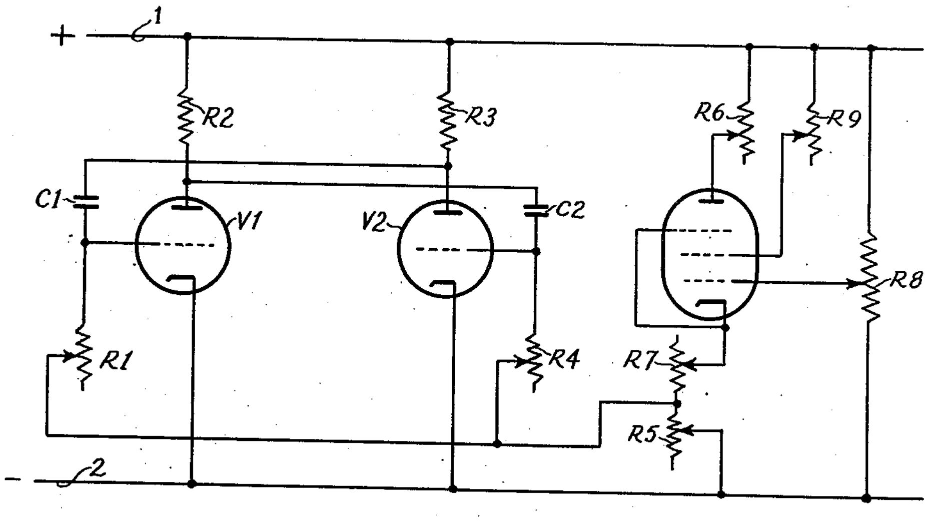

Fig. 2 shows an illustrative arrangement of a modification of Fig. 1, wherein a multi-grid tube is used as a control tube.

Figure 2A:
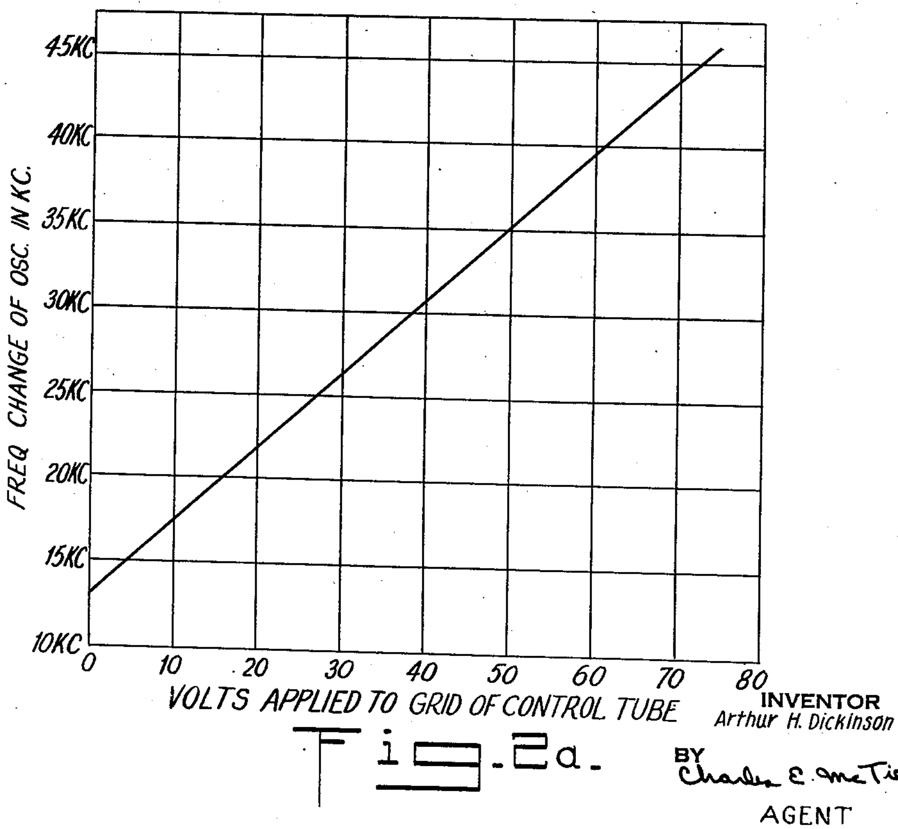

Fig. 2*a* is a graphical representation showing the linear relationship existing between the frequency of the multivibrator and the potential applied to the grid of the control tube.

Figure 3:
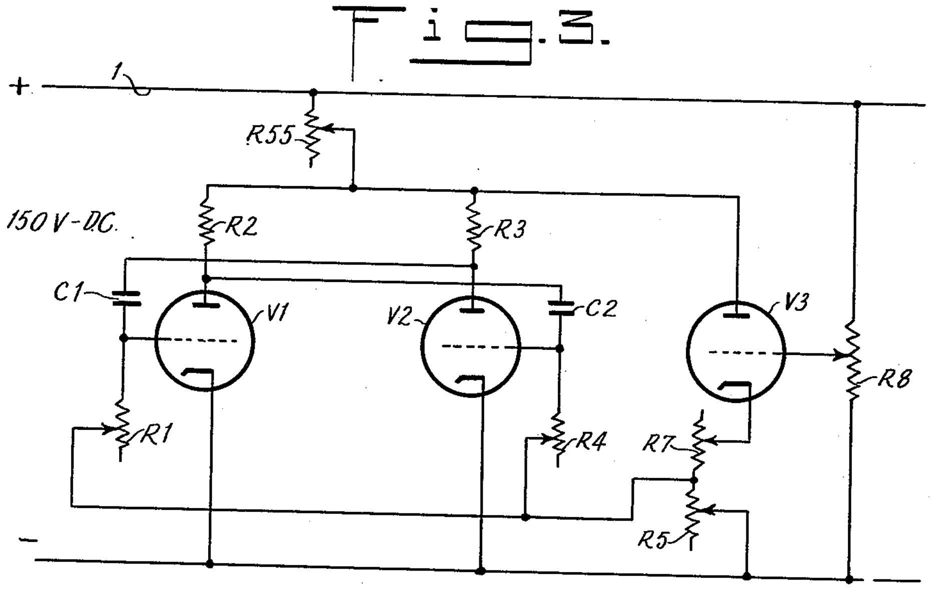

Fig. 3 is a circuit diagram of a modification of the circuit of Fig. 1 wherein the plate supply voltage and the control electrode bias of the multivibrator tubes are varied simultaneously in response to a change in the grid potential of the control tube to change the frequency of oscillation of the oscillator.

Figure 3A:
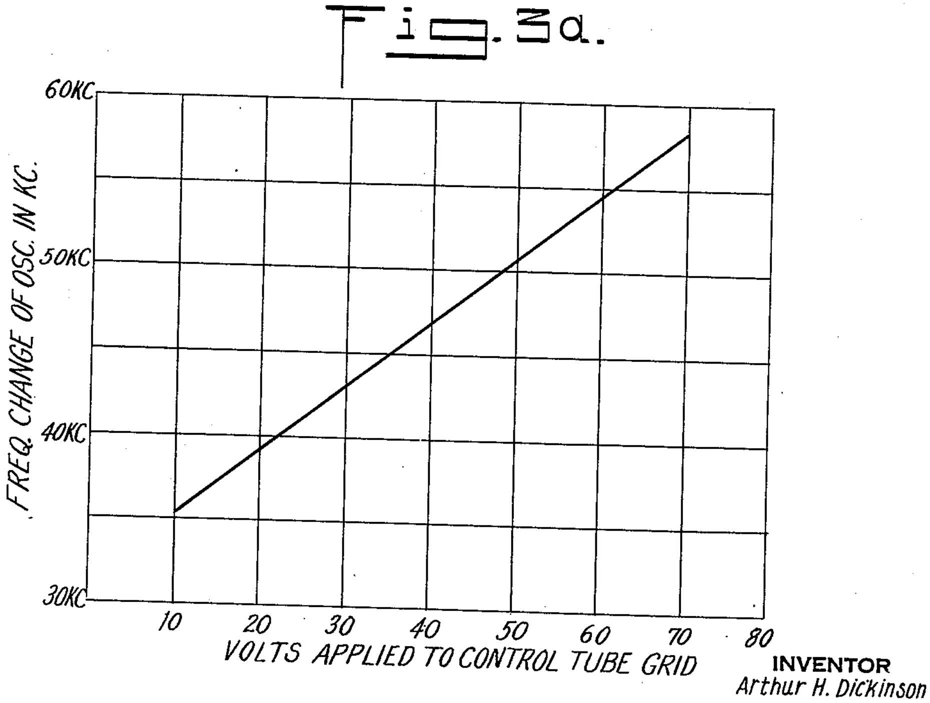

Fig. 3*a* is a straight line curve showing the relationship between the change in the frequency of the multivibrator and the potential applied to the grid on the control tube.

This invention is directed towards the improvement of those electro-mechanical or electronic systems that are used in determining the average value or the instantaneous value of an unknown varying phenomena.

In the copending application, Serial No. 114,321, filed September 7, 1949, there is described a complete system showing one of the contemplated uses of the controllable oscillator circuit which is described herein. In this system, of the aforementioned copending application, the varying quantity, the magnitude of which is to be determined, is applied in the form of a potential to the grid of a control tube which, in turn, operates upon the bias potential of the multivibrator tubes thereby producing a linear change in frequency. The change in frequency induced by the varying quantity is applied for a predetermined time interval, as determined by a first electronic counter, to a second electronic counter which manifests the digital value of the varying quantity at the end of the aforementioned time interval. The determination of the average or the instantaneous value of the varying quantity is governed by the extent of the time interval during which the magnitude of the varying quantity has changed.

Referring to Fig. 1, there is shown therein the main embodiment of the invention wherein vacuum tube means, in the form of a cathode follower circuit, is employed to control the frequency of oscillation of the multivibrator. This circuit illustrates the manner in which the frequency of a multivibrator may be controlled by and in proportion to a force, namely, an electrical potential.

There is shown in Fig. 1 a multivibrator circuit having a pair of electronic discharge devices or tubes V1 and V2 with the cathode of each of the devices connected directly to the low side of the source of potential. The anodes of each of the multivibrator tubes V1 and V2 are respectively connected to a positive source of potential through the anode resistors R2 and R3. The anodes of each of the devices V1 and V2 are also capacitively cross-coupled to the control grid of the other device. The normal bias of the tubes V1 and V2 is positive which is derived from the resistor R5 which at one end thereof is connected to the adjustable grid resistors R1 and R4 and which is connected to ground at the other end by the means of a movable contact arm. The positive bias voltage is produced across the resistor R5 by virtue of a circuit which includes the adjustable resistor R6, the cathode follower control tube V3 having the cathode resistor R7 in series with the resistor R5. The resistor R6 is connected between the anode of the tube V3 and a positive source of potential while the resistors R5 and R7 are connected between the cathode of the tube V3 and the low side of the source of operating potential. The control grid of V3 is connected to the movable arm of a potentiometer R8, which is illustrative only of a varying unknown force or quantity.

The use of the resistor R5 as a common return for the grid resistors R1 and R4 permits the injection of intelligence into the multivibrator circuit which reflects such intelligence as a change in frequency. The adjustability of the resistors R5 and R7 makes for a more flexible circuit inasmuch as the rate of change of the absolute potential applied to the grid of the cathode follower V3 with respect to a change in the frequency of the multivibrator is capable of being varied.

The multivibrator employed in the circuit arrangement of Fig. 1, is one having two states of equilibrium wherein the tubes V1 and V2 are alternately rendered conducting and non-conducting due to the cumulative regenerative action of the circuit such as is well known in the art.

Now when the magnitude of the unknown quantity, as represented by the potentiometer R8, increases, then the voltage applied to the grid of the cathode follower control tube V3 increases resulting in a corresponding increase in the current flow through the resistor R6, control tube V3, and resistors R7 and R5. This increase in current flow through the resistor R5 increases the positive grid bias which is applied to tubes V1 and V2 which produces a linear increase in the frequency of the multivibrator, such as shown in Fig. 1*a*. The graphical representation of Fig. 1*a* shows that due to the use of the cathode follower, the circuit of Fig. 1, produces greater linearity and range of frequency change than that attained in the circuit arrangement of the prior art.

Likewise for a reduction in the grid voltage applied to tube V3, due to a decrease in magnitude of the unknown quantity, there is a decrease in the current flow through the resistor R6, the control tube V3, and resistors R7 and R5. This action results in a decrease of the positive bias applied to the control tubes V1 and V2 thereby resulting in a linear decrease for the frequency of the multivibrator.

If the circuit providing the positive bias potential is removed and the resistor R5 is replaced with a variable voltage source of constant internal resistance equalling the resistor R5, the frequency of the multivibrator would be a definite function of the voltage applied but the rate of change of frequency with respect to the applied voltage would not be a constant. When, however, a cathode follower, connected in the manner of V3, is employed to apply a voltage across the resistor R5, the frequency of the multivibrator is now related by a further certain definite function of the voltage applied to the grid of tube V3. This expression is such that the rate of change of frequency with respect to the absolute voltage of the control tube grid is a constant. Furthermore, by applying a voltage across resistor R5 by a control tube, such as V3, the frequency of the multivibrator can be varied not only at rates extremely wide in range, but also without drawing any power from the grid voltage source of tube V3. It should be noted that with a proper design of the potentiometer R8 that the frequency of the multivibrator may be made to follow any desired input variations.

A modification of the invention of Fig. 1 is shown in the circuit arrangement of Fig. 2 wherein a pentode is employed as the control tube in place of the triode control tube of Fig. 1. One advantage of employing a pentode rather than a triode as a control tube is that the control tube-oscillator combination as a whole is responsive to a somewhat wider range of voltages which are applied to the grid of V3. The graphical representation of Fig. 2*a* shows the range of voltage applied to the grid of the control tube V3 of Fig. 2 as well as the range of frequency change attained under actual operating conditions.

In the modification of Fig. 3, there is shown a circuit arrangement whereby a compounded effect upon the multivibrator circuit is produced by the cathode follower control tube V3 resulting in a greater change in linearity and range per volt change in the absolute voltage applied to the grid of the tube V3. The multivibrator circuit comprises a pair of triodes V1 and V2, which could also be a pair of multi-grid tubes without departing from the scope of the invention, with each of the triodes having an anode, a control electrode and a cathode. The anodes of each of the tubes V1 and V2 are cross-coupled respectively through the capacitors C2 and C1 to the control grid of the other tube. The cathodes of each of the tubes are connected directly to ground potential by the line 2 which is connected to the negative terminal of a source of potential. In the respective anode circuit of each of the tubes V1 and V2, there are the resistors R2 and R3 commonly coupled to the adjustable resistor R55 which is connected to the line 1 which is, in turn, connected to the positive terminal of a source of potential. The cathode follower control tube V3 is coupled between the junction of the resistors R2, R3, and R55 and the line 2. The cathode of the tube V3 is slidably connected to the resistor R7 which is connected in series with the resistor R5 which is adjustably coupled to the line 2. The resistor R5 supplies the positive bias voltage to the grid resistors R1 and R4 of the tubes V1 and V2, respectively, thus permitting the multivibrator to be driven at a positive bias. The grid of the control tube V3 is adjustably coupled to the potentiometer R8 which is representative of a varying quantity in the form of a potential.

Now when there is an increase in the grid voltage of V3, as supplied by the potentiometer R8, the voltage drop across the resistors R5 and R55 increases thereby resulting in an increase in the frequency of the multivibrator which varies linearly with a change in the absolute grid voltage of V3, such as shown by Fig. 3*a*. Thus, it can be seen that as the grid potential of the tube V3 varies, there is a direct and linear change in the frequency of the multivibrator due to variation in the positive grid bias of the multivibrator and the plate supply voltage applied to the multivibrator.

While there have been shown and described and pointed out the fundamental novel features of the invention, as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A multivibrator circuit comprising a first and second electron discharge means each having an anode, a control electrode and a cathode, said anodes and control electrodes being capacitively cross coupled, a source of operating potential having a positive and negative terminal supplying said discharge means, a resistor connected between the anode of each of said discharge means and the positive side of said operating potential, the cathode of each of said discharge means coupled directly to the ground side of said operating potential, a third electron discharge means having a cathode, a control grid and an anode, the anode of said third discharge means being coupled to the high side of said operating potential through a resistor, the cathode of said third discharge means being coupled to ground through a cathode resistor, each of the control electrodes of said first and second discharge means being coupled to said cathode resistor thereby positively biasing said first and second discharge means, a source of varying potential, said varying potential being applied to the grid of said third discharge means whereby the variation of said grid voltage of the third discharge means varies the bias of said first and second discharge means resulting in a linear change in the frequency of said multivibrator circuit.

2. In an oscillator circuit comprising first and second electronic tubes each having an anode, a control electrode and a cathode, a source of operating potential having a positive and negative terminal, each of said anodes being coupled to the positive terminal of said source through impedance means, the cathode of each of said tubes being connected directly to the negative terminal of said source, the anode of each tube capacitively cross-coupled to the electrode of the other tube, means for supplying a positive bias potential to the control electrode of each of said tubes, a source of variable potential illustrative of a varying quantity, a cathode follower circuit comprising an electron discharge device having an anode, a control grid and a cathode with a cathode resistor in the cathode circuit thereof, means coupling said cathode resistor with said bias means, said device being coupled to said variable potential whereby the current flow through said device varies with a change in said variable potential thereby changing said bias means and producing a linear change in the frequency of said circuit.

3. A multivibrator circuit comprising first and second electron discharge devices each having an anode, a control grid and a cathode, a first source of operating potential having a positive and negative side, an impedance element coupled to the anode of each of said devices, said impedance elements being connected in parallel with each other and commonly connected to one end of an adjustable impedance element, the other end of said adjustable element being coupled to the positive side of the potential, the cathode of each of said devices being coupled to the negative side of said source, a grid resistor connected to the grid of each of said devices, the anode of each of said devices capacitively coupled to the control grid of the other device, means for rendering said devices alternately conducting and non-conducting, a third electron discharge device having an anode, a control electrode and a cathode, the cathode of said third device coupled through a cathode impedance to the negative side of said second source, the anode of said third device coupled to the common connection of said impedance elements and said adjustable element, the grid resistors of each of said devices being coupled to said cathode impedance whereby a positive bias potential is applied to said first and second devices, a source of variable voltage applied to the control electrode of said third device whereby as the control electrode grid voltage of said third device varies the positive bias and the plate potential applied to said first and second devices varies accordingly, the variation of said bias and said plate potential inducing a linear change in the frequency of said multivibrator with respect to the change of the absolute voltage of the control electrode of said third device, the frequency of said multivibrator varying over a wide range of frequencies.

4. In an oscillator circuit comprising first and second electronic tubes each having an anode, a control electrode and a cathode, a source of operating potential having a positive and negative side, the anode of each of the tubes capacitively coupled to the electrode of the other tube, each of the anodes of said tubes coupled to the positive side of said source through an impedance network, the cathode of each of said tubes coupled to the negative side of said source, a cathode follower control tube having an anode, a control grid and a cathode, the cathode of said control tube connected to the negative side of said source through a cathode impedance, the anode of said control tube coupled to said impedance network, a grid resistor connected to the electrode of the first and second tubes, each of said grid resistors commonly connected to the cathode impedance whereby a positive bias potential is supplied to the electrodes of said first and second tubes, a source of variable potential applied to the control grid of said control tube, a change in said variable potential producing a change in the control grid voltage thereby inducing a change in the anode potential and the bias potential of said first and second tubes, the frequency of oscillation of said oscillator varying linearly with respect to the variations of said anode potential and bias potential over a wide range of frequencies.

ARTHUR H. DICKINSON.

REFERENCES CITED

The following references are of record in the file of this patent:

UNITED STATES PATENTS

| Number | Name | Date |
|---|---|---|
| 2,338,395 | Bartelink | Jan. 4, 1944 |
| 2,392,114 | Bartelink | Jan. 1, 1946 |
| 2,432,204 | Miller | Dec. 9, 1947 |
| 2,434,294 | Ginzton | Jan. 13, 1948 |